(12) United States Patent
Butler et al.

(10) Patent No.: US 6,401,091 B1
(45) Date of Patent: Jun. 4, 2002

(54) BUSINESS INFORMATION REPOSITORY SYSTEM AND METHOD OF OPERATION (75) Inventors: Kathy Elaine Butler, Upper Marlboro, MD (US); George Kenneth Sergent, Annandale, VA (US)

(73) Assignee: Electronic Data Systems Corporation, Plano, TX (US)

( * ) Notice: Subject to any disclaimer, the term of this patent is extended or adjusted under 35 U.S.C. 154(b) by 1018 days.

(21) Appl. No.: 08/567,447

(22) Filed: Dec. 5, 1995

(51) Int. Cl.[7] .............................................. G06F 17/30
(52) U.S. Cl. ................................ 707/10; 707/3; 707/4; 707/5
(58) Field of Search ................................ 395/600, 603, 395/601, 602, 442, 157, 500, 800; 305/605; 364/401, 468, 402, 419.19; 354/401; 707/3, 4, 5, 10

(56) References Cited

U.S. PATENT DOCUMENTS

| | | | | |
|---|---|---|---|---|
| 4,829,453 A | * | 5/1989 | Katsuta et al. | 364/521 |
| 4,870,576 A | * | 9/1989 | Tornetta | 364/401 |
| 5,032,989 A | * | 7/1991 | Tornetta | 364/401 |
| 5,050,071 A | * | 9/1991 | Harris et al. | 364/200 |
| 5,093,794 A | * | 3/1992 | Howie et al. | 364/468 |
| 5,195,178 A | * | 3/1993 | Krieger et al. | 395/157 |
| 5,216,593 A | * | 6/1993 | Dietrich et al. | 364/402 |
| 5,233,513 A | * | 8/1993 | Doyle | 354/401 |
| 5,241,645 A | * | 8/1993 | Cimral et al. | 395/500 |
| 5,249,300 A | * | 9/1993 | Bachman et al. | 395/800 |
| 5,321,610 A | * | 6/1994 | Breslin | 364/419.19 |
| 5,487,161 A | * | 1/1996 | Koenck et al. | 395/442 |
| 5,493,490 A | * | 2/1996 | Johnson | 364/401 |
| 5,577,241 A | * | 11/1996 | Spencer | 305/605 |

OTHER PUBLICATIONS

Proceedings of the International Conference on Very Large Data Bases, Sep. 11, 1995, pp. 54–65, XP000601038, Konopnicki, D. et al.: "W3QS: A Query System for the World–Wide Web".*

* cited by examiner

Primary Examiner—Frantz Coby
(74) Attorney, Agent, or Firm—Baker Botts, L.L.P.

(57) ABSTRACT

A business information repository system (10) is provided that is coupled to a distributed network (12). The business information repository system (10) includes a user interface that is coupled to a control system (28). The control system (28) accesses a business information database (65) using a search engine (26). The business information database (65) includes business information including glossaries, graphics, resumes, skills inventories, citations, proposals, customer information and internal corporate profiles, vendor information, standard solutions, and forecasted deal information. Utility functions (56) are provided including a data access manager (32), a forecasting engine (58), a graphics utility (60) and a population engine (62).

18 Claims, 4 Drawing Sheets

BUSINESS INFORMATION REPOSITORY SYSTEM AND METHOD OF OPERATION

TECHNICAL FIELD OF THE INVENTION

This invention relates in general to the field of data processing systems and more particularly to a unique system and method for the storage and retrieval of business information.

BACKGROUND OF THE INVENTION

In the modern business environment, many transactions involve highly structured bidding processes. These processes are common in contracts which involve public funding, such as work performed for the federal government, as well as large private contracts. In these contexts, the preparation of a written proposal by a company bidding for a contract represents a tremendous amount of work and a correspondingly large expense to the company. Because of the fact that many companies will bid on the same type of work over and over again or will bid for work from the same entity or agency, many proposals contain large amounts of repetitive information. For example, the background of the company, the skills and resumes of key personnel within the company, the background information on the customer as well as many other types of information may be repeated between similar proposals made by a particular company. If the compilation of this shared information must be repeated for each proposal made by a company, this activity represents a significant wasted expense for the company.

Companies which bid on contracts issued by the federal government, for example, are allowed to include within their proposals an allocation of money for bid and proposal activities. In other words, the federal government in effect pays for a certain percentage of the dollars of the money spent by companies in preparing the bids and proposals for federal contracts. As such, if a company can reduce the amount of time and money spent on the preparation of the compilation of information and preparation of formal proposals for federal contracts, the company can dramatically increase its return on investment and potentially reduce the amount bid for a contract to increase the likelihood that a contract will be awarded to the company. As such, if a company can increase the efficiency in which it can prepare formal bids and proposals for contracts, it can realize more profit and be awarded more contracts. In the past, there has been little effort to use modern data processing technology to compile and store business information which can be used in contract proposals.

Accordingly, a need has arisen for a business information repository and retrieval system that allows for information that can be shared among many proposals to be stored and retrieved using modern data base and data processing techniques.

SUMMARY OF THE INVENTION

Accordingly, a business information repository and retrieval system and method of operation are provided that substantially eliminate and reduce disadvantages and problems associated with prior systems.

According to one embodiment of the present invention, a system is provided that comprises a user interface that is coupled to and interacts with a business information control system. The business information control system accesses business information abstracts using a search engine. Once a particular piece of business information is identified using the business information abstracts, the business information control system can use a data access manager to retrieve the raw data associated with the business information abstract selected.

BRIEF DESCRIPTION OF THE DRAWINGS

A more complete understanding of the advantages of the present invention may be acquired by referring to the accompanying Figures in which like reference numbers indicate like features and wherein.

DETAILED DESCRIPTION OF THE INVENTION

System Environment and Operation

Figure 1:
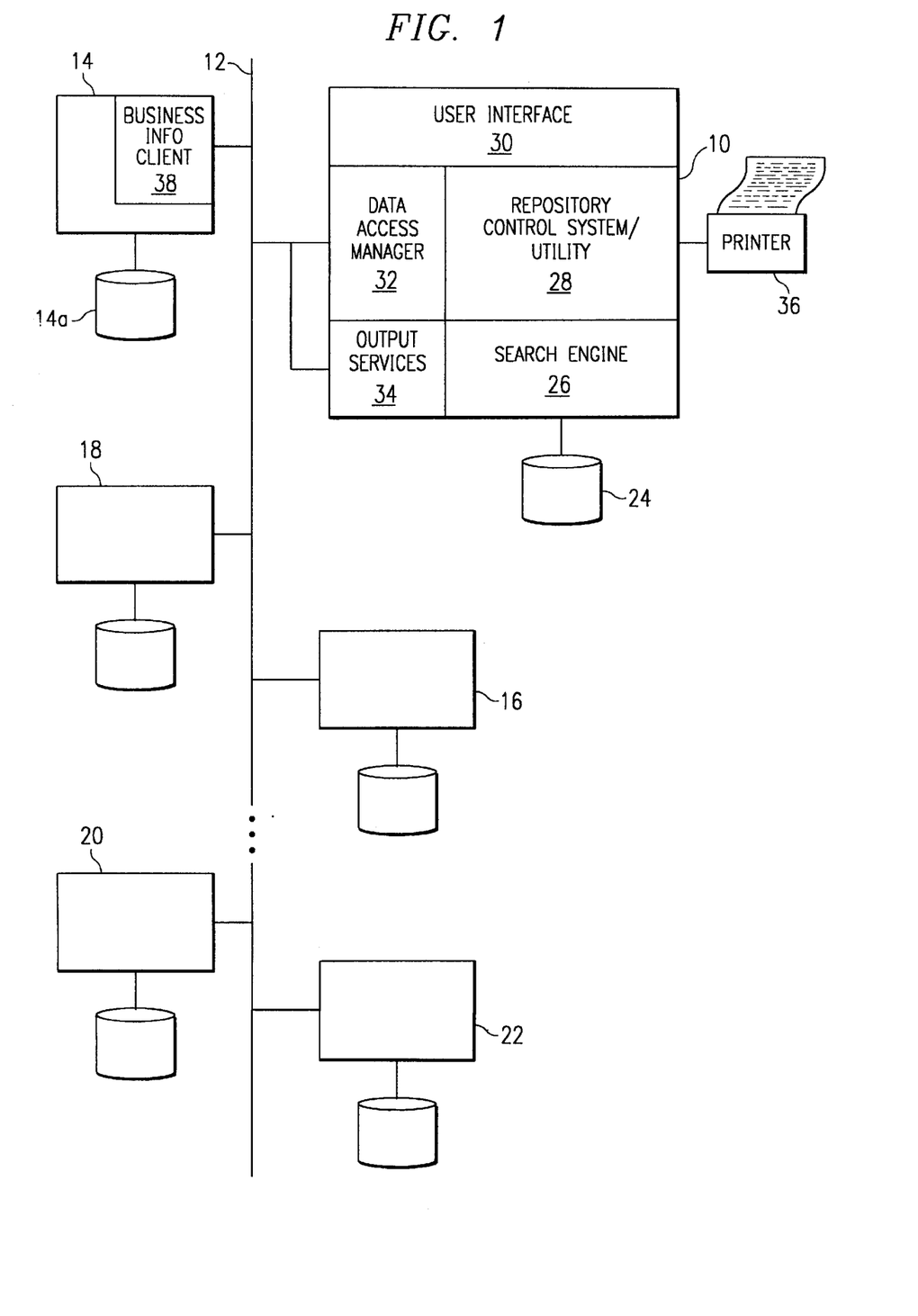
FIG. 1 is a block diagram of one possible hardware environment for the business information system of the present invention.

FIG. 1 illustrates a business information repository system 10 which is coupled to a computer network 12. Computer network 12 allows for the transfer of data between repository system 10 and other computer systems 14, 16, 18, 20 and 22 coupled to computer network 12. Network 12 may comprise a variety of network architectures, such as a local area network or a wide area network or other suitable platform for providing communication between the various nodes connected to the network to provide for distributed processing and data storage capability between the various computer systems 10, 14, 16, 18, 20, and 22.

Each of the nodes connected to network 12 manages and controls a data storage capability. For example, computer system 14 uses, manages and controls data storage 14a shown in FIG. 1. Data storage 14a may comprise a large scale disk storage or tape drive storage system.

Business information repository system 10 also uses a mass storage capability embodied in data storage system 24 shown in FIG. 1. As will be discussed herein, data storage system 24 is used to store business information abstracts which are accessed by the business information repository system 10 using a search engine 26. The search engine 26 acts under the control of a repository control system and utility 28. The systems within business information repository system 10 may be accessed by a user through a user interface 30. After a user of system 10 has located a particular piece of business information using the search engine 26 and the business information abstracts stored in data storage system 24, the user can access the raw data associated with the business information abstract through a data access manager 32. Output from the business information repository system 10 can be routed via electronic mail or suitable data transfer through an output services system 34. In addition, conventional printing control is supplied to drive a conventional printer 36 to print reports and hard copies of business information retrieved from either data storage 24 or from other distributed data storage through computer network 12.

In general, according to the teachings of the present invention, a user of system 10 may use search engine 26 to access business information abstracts stored in data storage system 24. The business information repository system 10 is coupled to a distributed network 12 which allows the system 10 to retrieve the raw data associated with the abstracted data from other data storage facilities connected to the network 12. For example, a user might locate a particular business graphic having a palm print of the graphic stored within data storage system 24. The user could then utilize data access manager 32 to retrieve the actual file containing the full business graphic from data storage system 14*a* through computer system 14 coupled to network 12.

A user of system 10 may access the repository control system 28 and the search engine 26 through user interface 30 or the business information system 10 may act as a server to other nodes connected to its facilities through network 12. For example, a user of computer system 14 may utilize a business information client system 38 to access the repository control system 28 and thereby access all the functionality of system 10 through a conventional distributed client server relationship between computer system 14 and computer system 10.

Business Information Repository System Architecture

Figure 2:
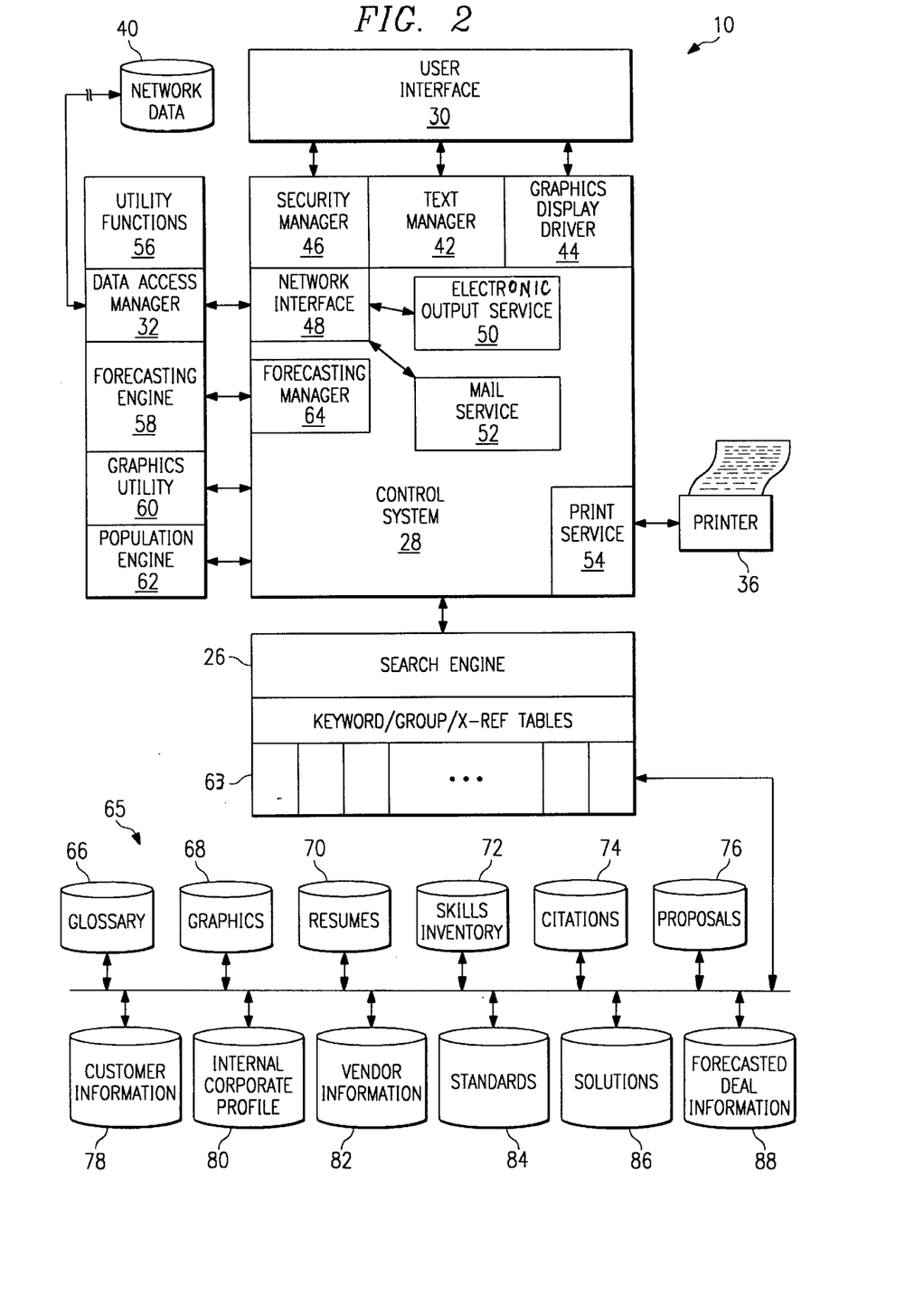
FIG. 2 is a block diagram of one embodiment of the business information system of the present invention.

FIG. 2 is a detailed representation of the architecture of business information repository system 10. As discussed with reference to FIG. 1, a control system 28 interacts with a user interface 30 to provide access to the operation of system 10. Control system 28 further accesses a data storage system and specifically abstracts of business information stored in data storage system 24. Control system 28 accesses data storage system 24 through a search engine 26. Access to the raw data associated with the abstracts of business information is provided through a data access manager 32 which interfaces with network data 40 which may be stored, for example, on data storage system 14*a* described previously.

Control system 28 itself comprises a number of components. Control system 28 creates and controls the user interface 30 using a text manager 42 and a graphics display driver 44. Text manager 42 outputs the characters and font information for all or part of the text information displayed by user interface 30. Graphics display driver 44 similarly outputs the graphic information which is used by the user interfaced 30 to display information, prompts, screens, etc. to users using the user interface 30. Control system 28 also comprises a security manager 46 which comprises a suitable software system to insure only authorized users have access to the control system 28 and, in turn, to the operation of business information repository system 10. Security manager 46 also acts as a gateway for remote users to access the control system 28. As such, the security manager 46 interfaces with the user interface 30 and with a network interface 48 to monitor and control accesses to the control system 28 that occur through the data access manager 32 from the operation of business information client systems such as business information client system 38 accessing the control system 28 through the-network system 12 discussed-previously.

The network interface 48 comprises a fully functional interface to network 12 and provides client server access to control system 28. In addition, the network interface 48 provides a gateway for electronic data transfers to and from control system 28. Output of electronic data is controlled through the operation of electronic output service system 50 operating under the control of control system 28 and in communication with network interface 48. Further, the output of business information can also be directed using electronic mail. This is accomplished under the control of control system 28 through the operation of a mail service system 52 which is also in communication with network interface 48. Mail service 52 may comprise a suitable client routine in communication with an electronic mail server connected to network system 12.

Control system 28 can also provide the output for printed copies of business information. Printing hard copies of information is accomplished by a print service system 54 which operates under the control of control system 28 and communicates with the printer 36 described previously.

The data access manager 32 comprises one of a number of utility functions 56 which operate under the control of control system 28. As described previously, data access manager 32 provides a gateway to distributed data storage and processing capability embodied in network system 12. Other utility functions include a forecasting engine 58, a graphics utility system 60 and a population engine 62. Forecasting engine 58 operates in communication with a forecasting manager 64 which is controlled by control system 28. The operation of forecasting engine 58 and forecasting manager 64 will be described more completely with reference to FIG. 5. In general, the system 10 of the present invention provides an important capability to not only access stored business information from past transactions associated with a business entity, but to also use certain portions of the business information to predict, plan and organize efforts to acquire new business in the future. To this end, the forecasting manager 64 and the forecasting engine 58 provide a user of system 10 with planning and scheduling utilities which allow the user to allocate scarce bid and proposal budgets to efficiently respond to future opportunities to make business proposals for new contracts and work.

The graphics utility 60 operates to process data associated with business graphics to create palm prints of the business graphics for storage within data storage system 24. Graphics utility 60 also functions to translate and further process business graphics to enable them to be used in a variety of presentation and document contexts. Graphics represent a large percentage of the costs involved with preparing business documents and as such, their efficient manipulation, storage, retrieval and processing is an important technical advantage of system 10. One embodiment of graphics utility 60 which is ideally suited for the operation of system 10 is described in applicant's patent application entitled "Business Graphics Processing System and Method", filed concurrently with the present patent application, the disclosure of which is hereby incorporated by reference as if fully set forth herein.

Utility functions 56 also comprise a population engine 62. Population engine 62 is used by an administrator of system 10 to examine business information and to create abstracts of the business information which are then appropriately linked to other abstracts through key word, group, and cross-reference tables 63 associated with the search engine 26. The population engine 62 operates, in the case of textual information, to parse a new piece of business information and to create a list of suggested key words which may be used to index the new piece of information. The population engine 62 also includes the ability to receive from an administrator or other user a short description of the new piece of business information. The population engine 62 also manages the creation of new key words if necessary. After appropriate key words are identified or created and an abstract of the business information is completed, population engine 62 interacts with the control system 28 to incorporate the new abstract of the business information within the relational database managed by the search engine 26.

The search engine 26 uses key word, group, and cross-reference tables 63 to access a large number of business information abstracts stored in storage system 24. FIG. 2 illustrates the organization of the abstracts stored in data storage system 24 discussed with reference to FIG. 1. Although the various subdivisions of information are illustrated in FIG. 2, it should be understood that physically the abstracts may be stored together on a single storage system or on a number of distributed data storage systems.

Business Information Database

The search engine 26 and the key word, group, and cross-reference tables 63 are used to access a business information database 65 which is physically stored in data storage system 24 coupled to business information system 10. Business information database 65 comprises a relational database which organizes and manages abstracts of business information which is stored in network data system 40. The abstracts of business information are subdivided into the data repositories illustrated in FIG. 2. The business information database 65 creates and manages links between the various abstracts to enable the users searching the database to access relevant information and discover other relevant information according to the operation of modern, relational database systems or object-oriented database systems. The business information database 65 is managed by search engine 26 through the use of the tables 63. The business information database 65 may comprise, for example, an SQL-based database such as Oracle or the like. Accordingly, a single search engine 26 acts as a user interface to a business information database 65 that comprises a plurality of data repositories storing abstracts of disparate types of information associated with past activities of the business.

Business information database 65 may comprise a glossary database 66. Glossary database 66 includes a lexicon of all of the possible key words and terms used by an organization with definitions and explanations of the terms. Business information database 65 also incorporates a graphics database 68. Graphics database 68 stores palm prints and descriptions of various graphic images that may be incorporated into business documents. The key word group and cross-reference tables 63 include tables which link the abstracts of the graphic images to the documents in which they were originally incorporated.

The business information database 65 may also comprise a resume database 70. The resume database 70 stores abstracts of actual textual resumes which, for example, may have been incorporated into past business documents such as bids and proposals or current resumes that, as yet, have not been used. The abstracts of the resumes stored in resume database 70 are linked to the copies of the data associated with the complete resumes stored in network data 40. In addition, the resume abstracts stored in resume database 70 may be linked to other abstracted information. For example, a resume may include an image of the person associated with the resume. The palmprint and abstract of this image may be stored in graphics database 68. The business information database 65 is also used to store abstracted information in a skills inventory database 72. Skills inventory database 72 comprises a tabular representation of the skills and experience levels of all of the personnel of an organization. By accessing the skills inventory database 72, all of the people with a particular set of skills or experience can be identified. As discussed previously, the information within skills inventory database 72 may be linked to information within network data storage 40 or with other abstracted information within business information database 65. For example, a person identified within the skills inventory database 72 may be linked to the abstract of the person's resume stored within resumes database 70. In addition, the particular skill which is itemized in skills inventory database 72 may be defined in a corporate glossary stored within glossary database 66.

Business information database 65 may also comprise a citations database 74. Citations database 74 includes abstracts of textual and other information which describes the past performance of a business organization. This information can be in the form of textual reports of past performance as well as historical data that demonstrates compliance with past contract criteria or some other objective measuring criteria.

Business information database 65 may also comprise a proposals database 76. Proposals database 76 stores abstracts of past proposals which have been prepared for the business entity using the system 10 of the present invention. The abstracts stored in proposals database 76 are linked to the actual data comprising the proposals stored in network data storage 40. In addition, the abstracts of the proposals stored in proposals database 76 may be linked to the components of the proposals themselves or the abstracts of the components of the proposals. For example, an abstract of a proposal stored in proposals database 76 might be linked to a palm print of a graphic stored in graphics database 68, a resume of a participant in the project stored in resumes database 70 and a citation used in the past proposal to demonstrate the compliance of the organization with a particular industrial or government standard which might have been stored in citations database 74.

The business information database 65 may also comprise a customer information database 78. Customer information database 78 comprises abstracts of information about customers. The customer information itself may comprise textual information describing the organization of a customer such as an organizational chart, a list of key personnel, a list of addresses of customer sites, or a textual description of the business of a particular customer. Once again, the abstracts stored in customer information database 78 may be linked to other related information within other database sections within business information database 65.

Business information database 65 may also comprise an internal corporate profile database 80. Internal corporate profile database 80 comprises abstracts of information which describe the company or business entity using system 10. For example, internal corporate profile database might store a personnel list or organizational charts which are commonly used as support information in a business proposal.

Business information database 65 may also comprise a vendor information database 82. Vendor information database 82 comprises information which is similar to the information stored in customer information database 78 and internal corporate profile database 80. However, vendor information database 82 contains information which is related to subcontractors or other vendors associated with the business entity using system 10. For example, if a business wished to present a proposal and was going to rely on a subcontractor or vendor to supply a particular good or service, the proposal must contain information about that vendor. Such information might be repeated many times between proposals as a single subcontractor or vendor is used for different contracts. As such, this information can be abstracted in vendor information database 82. Once again, the information stored in vendor information database 82 may be cross-linked to other abstracts or to raw data stored within network data system 40. For example, vendor information abstracts might be cross-linked to old proposals which have abstracts stored in proposals database 76.

Business information database 65 may also comprise a standards database 84 which includes abstracts of textual information associated with industry and government standards associated with a business activity. It is often the case that a proposal for a new contract must detail how a business will comply with a particular standard. In these contexts, the language of the standard is quoted heavily within the proposal. As such, a user of system 10 attempting to compile information for a new proposal may need the entire text of standards. The standards database 84 allows for the location and retrieval of the text of industry and government standards. Once again, the abstracts within standards database 84 may be linked to instances where the standards were implemented in old proposals within proposals database 76 or within citation information in citations database 74.

Business information database 65 may also comprise a solutions database 86. Solutions database 86 comprises abstracts of textual information describing approved corporate solutions for particular problems or in particular circumstances. Historically, a company or other business entity might repeatedly encounter the same or similar challenges or problems. The company may therefore wish to archive the solution to those problems in a corporate-approved solutions document. These solutions documents do not need to be stagnant and may be updated as new technology and new solutions present themselves to particular problems. The solutions database 86 may be used to store abstracts of past and presently approved solutions. In this manner, the solutions database 86 can provide the current corporate approved solution to a problem as well as the historic links to other proposals and citation information about past instances where the same problem was solved. This information would, of course, be stored or accessed using proposals database 76 and citations database 74, respectively.

Finally, business information database 65 may comprise a forecasted deal information database 88. Forecasted deal information database 88 may comprise abstracts of documents and calendars associated with potential future opportunities for a business entity. The forecasted deal information database 88 is accessed by the forecasting manager 64 and the forecasting engine 58 to perform financial and temporal forecasting. These activities may be used by a user of system 10 to allocate personnel and funds to future deals and to explore various funding and staffing scenarios to better plan for the allocation of bid and proposal budgets. The forecasted deal information database 88 is populated with information about current contracts and especially the expiration date of current contracts. In addition, in certain contracting contexts such as government contracts, information about future recompete bids and future requests for proposals is available at times to potential bidders. This information could also be used to identify future deals and populate the forecasted deal information database 88. Once a future deal is abstracted and linked to other information within the database 88, the forecasting engine 58 and forecasting manager 64 may be used, as described herein to provide for scheduling of personnel and allocation of resources and money to coordinate the effort to create and present 25 proposals for the future deals.

In summary, a user of system 10 accesses the control system 28 through either user interface 30 or through a business information client 38 described previously. The control system 28 first insures that the user has appropriate access clearance to the system using the security manager 46. The user then accesses the search engine 26 to locate abstracted information in an effort to compile information for a new proposal or to perform forecasting of future deals. The search engine 26 operates using key words, groups and cross-reference tables 63 to locate the abstracts of information and returns-the appropriate results to the user through the user interface 30. The user can then retrieve the full data associated with the abstracted information by requesting the control system 28 to use the data access manager 32 to access the network data 40. The results of the search or the full data retrieved can be output to the printer 36 or can be electronically output through the electronic output service 50 or mail service 52. In this manner, the business information repository system 10 provides for a full featured relational database storing abstracts of business information that can be accessed to compile new proposals without having to recreate information which has been used in past proposals or in other contexts. In this manner, significant savings in time, money and effort is realized in preparing new proposals.

Business Information Database Architecture

Figure 3:
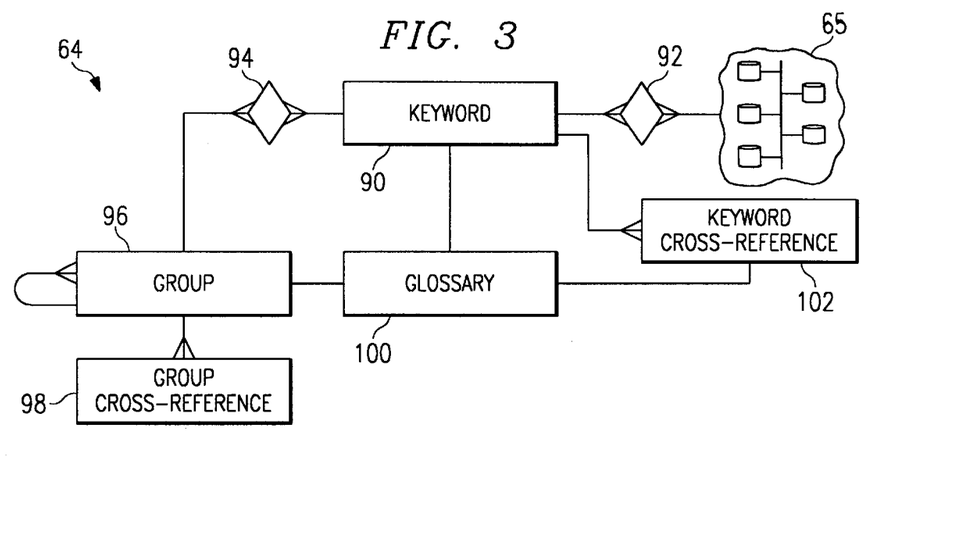
FIG. 3 is an entity relationship diagram illustrating the operation of the key word search engine used by the business information system of the present invention.

FIG. 3 illustrates the entity relationships of the key word, group, and cross-reference tables 63 used to access the business information database 65 described with reference to FIG. 2 previously. The tables 63 comprise a key word table 90 which is linked through a link 92 in a many-to-many fashion to the information within business information database 65. Key word table 90 is also linked through a link 94 in a many-to-many relationship with a group table 96. Group table 96 is linked in a one-to-many relationship with itself. Group table 96 is also linked in a one-to-many relationship with a group cross-reference table 98. Group table 96 and key word table 90 are linked in a one-to-one relationship with a glossary table 100. Key word table 90 is linked in a one-to-many relationship with a key word cross-reference table 102. The key word cross-reference table 102 is linked in a one-to-one relationship with the glossary table 100.

All accesses to the business information database 65 occur through the key word table 90. The user, however, is allowed to select groups of key words through accessing the group table 96. In addition, the groups are cross-referenced to each other using the group cross-reference table 98. Similarly, the key words are cross-referenced to one another using the key word cross-reference table 102. The glossary table 100 includes the entire list of key words groups, and cross-reference information.

As an example, a key word of "local area network" might be linked to a key word cross-reference of "LAN". The key word "local area network" might also be in a group within group table 100 of "communications" or "networks". The two groups "communications" and "networks" might be cross-referenced using group cross-reference table 98. The glossary table 100 would include entries for "local area network", and "communications networks" and "LAN". Using the tables 64, the search engine 26 is able to present the user with a plethora of choices to identify relevant information within business information database 65. The search engine 26 may present a variety of paradigms. For example, search engine 26 may include character and,string searches as well as conventional Boolean operations linking various key words to specify more particular search parameters.

Figure 4:
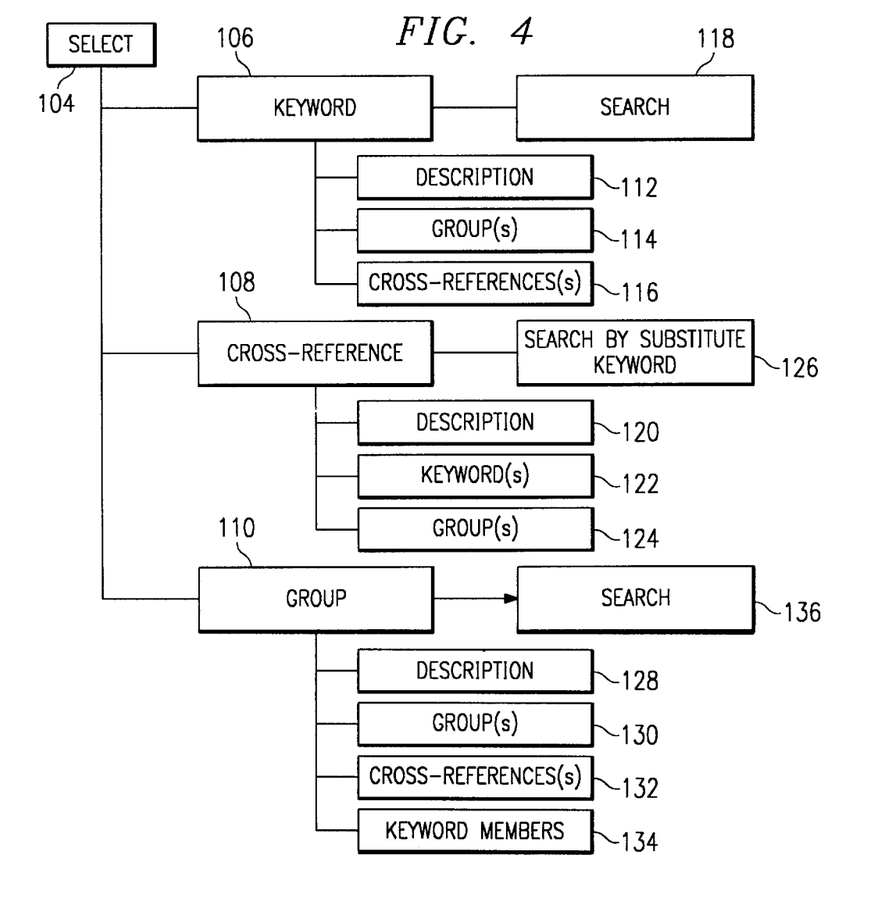
FIG. 4 is a flow diagram illustrating the options available to a user operating the search engine of the business information system of the present invention.

FIG. 4 is a flow diagram which illustrates the options given to a user of system 10 through user interface 30 or through business information client 38 when the user is navigating amongst the key words used to form a search of the business information database 65. The search engine 26 presents a select option 104, which allows the user to search a key word option 106, a cross-reference option 108 or a group option 110. Under the key word option 106, the user can access a description of the key word at option 112. In addition, the user can access a list of groups to which a particular key word belongs at option 114. In addition, the user can view cross references to a key word at an option 116. After a particular set of key words or single key word is selected, the user can begin the search by selecting an option 118.

Under the cross-reference option 108, the user can similarly access a description of the cross-referenced term at option 120. The user can access key words associated with a particular cross-reference at option 122. In addition, the user can access and view the groups to which a particular cross-reference belongs at option 124. Once a particular cross-reference or group of key words is selected, the user can institute a search of the business information database 65 by selecting the search option 126.

Under the group option 110, the user can access a description of the group using option 128. In addition, the user can view the groups to which a particular group belongs using option 130. The user can also access cross-references to a selected group using option 132. In addition, the user can view all of the key words which are members of a particular group using option 134. A user can also institute a search using an entire group by selecting the search option 136.

As can be seen, the options available to a user accessing the search engine 26 reflect the organization of the entity diagram described with reference to FIG. 3 previously. Together with the conventional search mechanisms that may be used to link key words to form Boolean expressions and character string searches, the key words groups and cross-references allow a user to access the business information database 65 in an extremely flexible and powerful manner.

Forecasting

Figure 5:
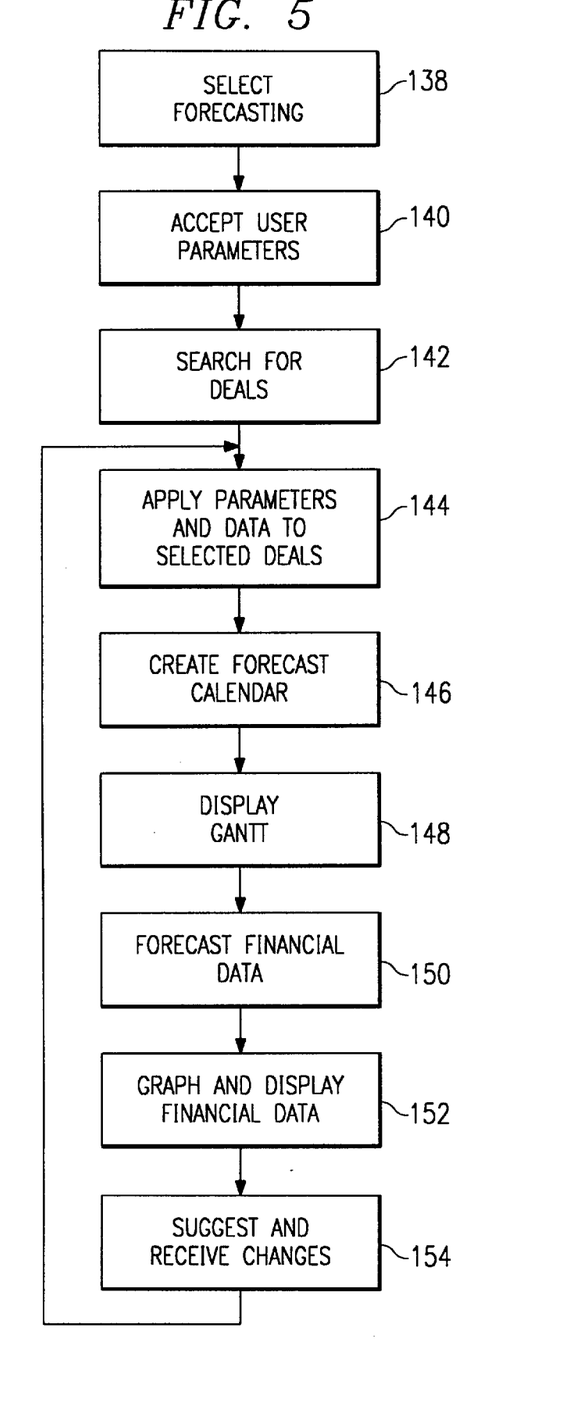
FIG. 5 is a flow diagram illustrating the operation of the forecasting system and method of the business information system of the present invention.

FIG. 5 is a flow diagram of the process that may be used to perform the forecasting function using the forecasting manager 64, the forecasting engine 58, the forecasted deal information database 88 and other functions and services of the business information repository system 10. The process shown in FIG. 5 begins at step 138 where a user selects the forecasting activity through either the user interface 30 or the business information client 38. The forecasting manager system 64 accepts user parameters and passes them to the search engine 26 in step 140. The search engine 26 then uses the key word group cross-reference table 64 to access the forecasted deal information database 88 at step 142. As described with reference to FIG. 2 previously, the forecasted deal information database 88 stores abstracts of information associated with future business opportunities that have been identified and placed in the forecasted deal information database 88 through the use of the population engine 62.

The method proceeds to step 144 where the parameters received from the user and the data received from the user are applied to the deals that have been selected. Control is then transferred to the forecasting engine 58 as the method proceeds to step 146. In step 146, the forecasting engine 58 creates a forecast calendar for the particular deal using the deal information as well as the parameters and data supplied by the user. The method then proceeds to step 148 where the forecasting engine 58 may create and display a Gantt chart illustrating a time line of the events prior to and immediately following the presentation of a proposal on a future business opportunity. The parameters and data supplied to the system to the user as well as the deal information stored within the forecasted deal information database 88 supplied background for the Gantt chart display to the user. According to one embodiment of the present invention, the displayed Gantt chart allows for an interactive user interface with the data stored in the database 88. For example, by selecting a particular piece of the timeline, the interface will automatically display information associated with that portion of the timeline. For example, by selecting a portion of the timeline, the interface could supply information as to the personnel involved with the activity selected or the amount of bid and proposal funds which have been allocated to the selected portion of the bid and proposal activity.

Referring again to FIG. 5, the method proceeds to step 150 where the forecasting engine 58 calculates the forecasted financial data. This information is then displayed in a graphical format in step 152 by the forecasting engine 58 through the graphics display driver 44 and the user interface 30. At this point, the user has access to both a Gantt chart and a conventional graphical representation of the entire bid and proposal process for a particular deal. The Gantt chart can reflect at first glance the timing of various activities within the bid and proposal effort and by selecting portions of the Gantt chart, the user can view financial information and staffing information. The financial data is graphed directly so that the user can view the allocation of bid and proposal resources and money at various points within the bid and proposal effort.

The method shown in FIG. 5 is interactive and iterative as can be seen as the method proceeds to step 154 where the forecasting engine 58 can calculate and suggest changes based on supply parameters. For example, a user may request the forecasting engine to change the financial data and the Gantt representation to maximize the return on investment on bid and proposal money. Using this as a parameter, the forecasting engine 58 will return to step 144 and apply the new parameters and constraints to the information retrieved from forecasted deal information database 88. At step 154, the user can also make direct changes to the data to iteratively view various scenarios as personnel and funds are allocated in different manners.

Accordingly, a business information repository system is provided that allows for the use of a high performance relational database to store cross-linked components of business information that can be accumulated and used to prepare proposals for new business relationships. The business information database may comprise glossary information, graphics resume, skills inventory, citations, proposals, customer information, internal corporate profiles, vendor information, industry standards, corporate approved solutions and forecasted deal information. By storing this information in abstracted form and by providing a high powered search engine to access the information, repetitive effort in the compilation and preparation of business information is avoided. In this manner, the enormous costs involved with compiling and preparing proposals for highly structured bidding processes are reduced and thereby the return on the investments if such contracts are awarded is maximized.

Although the present invention has been described in detail, it should be understood that various changes, alterations, substitutions and modifications may be made to the teachings described herein without departing from the spirit and scope of the present invention which is solely defined by the appended claims.

What is claimed is:

1. A business information repository system accessible by a user, comprising:

a control system coupled to a user interface accessible to the user;

a search engine coupled to the control system and operable to access a business information database;

the business information database comprising a plurality of data repositories, each data repository storing a plurality of abstracts of information associated with activities of the business;

a data storage system operable to store raw business data associated with the plurality of abstracts of information stored in the data repositories of the business information database; and a data access manager coupled to the control system and operable to access the data storage system and to retrieve the raw business data responsive to requests from the user.

2. The system of claim 1 and further comprising a graphics utility operable to receive data associated with a computer graphic image and to process the data to create a compressed bit map of the computer graphic image, a graphics database within the business information database operable to store the compressed bit map of the computer graphic image.

3. The system of claim 1 and further comprising a population engine accessible to selected users of the system and operable to parse raw business information data and suggest key words to be used to access abstracts of the raw business information data.

4. The system of claim 1 wherein the control system comprises a forecasting manager and wherein the business information database comprises a forecasted deal information database, the system further comprising a forecasting engine coupled to the forecasting manager, the forecasting engine and the forecasting manager operable to access the forecasted deal information database and to supply graphical representations of future business proposal activity based on the information stored in the forecasted deal information database.

5. The system of claim 4 wherein the graphical representations of future business activity comprises a Gantt chart illustrating in a time line fashion the activities required to prepare a future proposal and the estimated length of time required for each of the activities identified.

6. The system of claim 1 wherein the search engine comprises a plurality of key word tables and wherein:

the user accessing the search engine is allowed to identify search requests using key words linked by Boolean operators.

7. The system of claim 1 and further comprising a security manager operable to insure that only authorized users have access to the control system.

8. A business information repository system accessible by a user, comprising:

a control system coupled to a user interface accessible to the user;

a search engine coupled to the control system and operable to access a business information database;

the business information database storing abstracts of information associated with activities of the business;

a data storage system operable to store raw business information associated with the abstracts of business information stored in the business information database;

a data access manager coupled to the control system and operable to access the data storage system and to retrieve the raw business data responsive to requests from the user;

a graphics utility operable to receive data associated with a computer graphic image and to process the data to create a compressed bit map of the computer graphic image, a graphics database within the business information database operable to store the compressed bit map of the computer graphic image;

a population engine accessible to selected users of the system and operable to parse raw business information and suggest key words to be used to access abstracts of the raw business information;

a forecasted deal information database within the business information database; and a forecasting engine coupled to a forecasting manager, the forecasting engine and the forecasting manager operable to access the forecasted deal information database and to supply graphical representations of future business proposal activity based on the information stored in the forecasted deal information database.

9. The system of claim 8 wherein the graphical representations of future business activity comprise a Gantt chart illustrating in a time line fashion the activities required to prepare a future proposal and the length of time required for each of the activities identified.

10. The system of claim 8 and further comprising a search engine comprising a plurality of key word tables and wherein the user accessing the search engine is allowed to identify search requests using key words linked by Boolean operators.

11. The system of claim 8 and further comprising a security manager operable to insure that only authorized users have access to the control system.

12. A method of processing business information comprising the steps of:

storing key word tables and accessing the key word tables through a search engine;

parsing raw business information associated with past business activities to create abstracts of the raw business information;

storing the abstracts of the business information in a business information database;

linking the abstracts of the business information to the key word tables within the search engine;

accessing the business information database using the search engine to retrieve abstracts of past business activity; and retrieving the raw business information using a data access manager to access data storage facilities storing the raw business information.

13. The method of claim 10 and further comprising the steps of:

accessing a forecasted deal information database within the business information database;

supplying a forecasting engine with parametric limitations;

calculating in the forecasting engine a forecasted calendar for future business proposal activity;

displaying a Gantt chart illustrating the tasks required to prepare a future business proposal and the time required for each task; and receiving changes from a user and altering the displayed Gantt chart responsive to the changes received.

14. A population engine accessible to selected users and operable to parse raw business information data and suggest key words to be used to access abstracts of the raw business information data.

15. A control system for a business information repository system having a forecasted deal information database, the control system comprising a forecasting manager and a forecasting engine coupled to the forecasting manager, the forecasting engine and the forecasting manager operable to access the forecasted deal information database and to supply graphical representations of future business proposal activity based on the information stored in the forecasted deal information database.

16. The business information repository system of claim 1, wherein one of the data repositories of the business information database comprises a resume database operable to store a plurality of textual resumes.

17. The business information repository system of claim 1, wherein one of the data repositories of the business information database comprises a skills inventory database operable to store a plurality of personnel skills.

18. The business information repository system of claim 1, wherein one of the data repositories of the business information database comprises a proposals database operable to store a plurality of abstracts of past proposals.

* * * * *